(12) United States Patent
Schneider

(10) Patent No.: US 7,223,056 B2
(45) Date of Patent: May 29, 2007

(54) BLIND RIVET NUT

(75) Inventor: Stefan Schneider, Kirchhain (DE)

(73) Assignee: Newfrey LLC, Newark, DE (US)

( * ) Notice: Subject to any disclaimer, the term of this patent is extended or adjusted under 35 U.S.C. 154(b) by 181 days.

(21) Appl. No.: 11/037,760

(22) Filed: Jan. 18, 2005

(65) Prior Publication Data
US 2005/0158138 A1    Jul. 21, 2005

(30) Foreign Application Priority Data
Jan. 21, 2004   (DE)   ............... 10 2004 003 240

(51) Int. Cl.
F16B 19/10    (2006.01)
F16B 19/00    (2006.01)
(52) U.S. Cl. .................. 411/183; 411/509; 411/38; 411/43
(58) Field of Classification Search ............ 411/509, 411/183, 43, 38
See application file for complete search history.

(56) References Cited

U.S. PATENT DOCUMENTS

| | | | | |
|---|---|---|---|---|
| 1,365,719 A | * | 1/1921 | Ogden | 411/34 |
| 2,030,166 A | * | 2/1936 | Huck | 72/370.01 |
| 2,324,142 A | * | 7/1943 | Eklund | 411/38 |
| 2,887,926 A | * | 5/1959 | Edwards | 411/38 |
| 3,136,203 A | * | 6/1964 | Davis | 411/38 |
| 3,304,830 A | * | 2/1967 | Shackelford | 411/500 |
| 3,916,970 A | * | 11/1975 | Owens | 152/379.4 |
| 4,585,383 A | * | 4/1986 | Kraemer | 411/38 |
| 4,635,310 A | * | 1/1987 | Kendall | 470/11 |
| 4,784,551 A | * | 11/1988 | Kendall | 411/43 |
| 4,826,372 A | * | 5/1989 | Kendall | 411/43 |
| 4,869,629 A | * | 9/1989 | Witzigman | 411/38 |
| 4,900,205 A | * | 2/1990 | Sadri | 411/38 |
| 5,141,373 A | * | 8/1992 | Kendall | 411/43 |
| 5,178,502 A | * | 1/1993 | Sadri | 411/361 |
| 5,252,013 A | * | 10/1993 | Browne et al. | 411/43 |
| 5,256,017 A | * | 10/1993 | Smirnov et al. | 411/43 |

(Continued)

FOREIGN PATENT DOCUMENTS

DE        9212697.9         4/1993

(Continued)

OTHER PUBLICATIONS

European Search Report dated Apr. 21, 2005.

*Primary Examiner*—Katherine Mitchell
(74) *Attorney, Agent, or Firm*—Harness, Dickey & Pierce, P.L.C.

(57) ABSTRACT

A blind rivet nut has a head configured as an annular flange and a shank comprising a head end, a foot end and a cylindrical bore closed at the foot end of the shank and extending from the head end to the foot end in lengthwise direction, and a second bore segment near the head end whose diameter is greater than the diameter of the first bore segment. The wall surrounding the second bore segment forms a plastically deformable region of the shank, and has an outer surface with the shape of a regular polygonal, in particular hexagonal, prism. To achieve a uniform and tightly sealing contact of the flange with the part accommodating the blind rivet nut, the wall thickness of the deformable region in the thinnest places is 4% to 6% of the least outside diameter of the deformable region.

5 Claims, 1 Drawing Sheet

U.S. PATENT DOCUMENTS

| | | | |
|---|---|---|---|
| 5,259,713 A * | 11/1993 | Renner et al. | 411/34 |
| 5,403,135 A * | 4/1995 | Renner et al. | 411/34 |
| 5,645,383 A * | 7/1997 | Williams | 411/43 |
| 5,810,530 A * | 9/1998 | Travis | 411/34 |
| 5,919,016 A * | 7/1999 | Smith et al. | 411/34 |
| 6,761,520 B1 * | 7/2004 | Dise | 411/38 |
| 2002/0119024 A1 * | 8/2002 | Jennings et al. | 411/38 |
| 2005/0019129 A1 * | 1/2005 | Hesse et al. | 411/36 |
| 2005/0095078 A1 * | 5/2005 | Makino | 411/183 |

FOREIGN PATENT DOCUMENTS

| | | |
|---|---|---|
| EP | 0589144 A1 | 3/1994 |
| EP | 0634582 A1 | 1/1995 |
| GB | 2310904 A | 9/1997 |

* cited by examiner

US 7,223,056 B2

BLIND RIVET NUT

CROSS-REFERENCE TO RELATED APPLICATIONS

This application claims the benefit of German Patent Application No. 10 2004 003 240.8 filed Jan. 21, 2004. The disclosure of the above application is incorporated herein by reference.

BACKGROUND OF THE INVENTION

The invention relates to a blind rivet nut having a head forming an annular flange and a shank comprising a head end, a foot end, and a cylindrical bore extending in lengthwise direction from the head end to the foot end, closed at the foot end of the shank and having a second bore segment neighboring the head end whose diameter is greater than the diameter of the first bore segment, the wall surrounding the second bore segment forming a plastically deformable portion of the shank and having an outer surface formed as a regular polygon, in particular a hexagonal prism.

Blind rivet nuts are employed chiefly in thin-walled parts, in particular made of sheet metal, to provide them with a fastening thread that can serve for fastening a stud or a bolt. Blind rivet nuts may also serve to connect two or more thin-walled parts to each other. Blind rivet nuts may, for example, be employed in the sheet-metal roofs of automobiles so that a roof member or roof railing may be attached thereto. For such applications, blind rivet nuts are made with closed end so that a tight closure of the roof is obtained after insertion of the blind rivet nut.

Blind rivet nuts of the kind specified are disclosed in EP 0589144 A1, EP 0634582 A1 and WO 02/081936 A1.

In fastening blind rivet nuts of the specified kind, the problem arises that the forces acting on the thin-walled or sheet-metal part accommodating the blind rivet nut may deform the sheet-metal or other thin-walled part in such manner that uniform contact with the flange of the blind rivet nut is no longer obtainable. This is especially disadvantageous if a tight connection, preventing passage of a liquid or gaseous medium, is to be made between the blind rivet nut and the sheet-metal or other thin-walled part. Another problem arises in the fastening of the blind rivet nut, in achieving a sufficiently great radial extent of the polygonal bulge formed in the deformation of the deformable region on the blind side.

The object of the invention is to create a blind rivet nut of the kind initially mentioned that is simply and reliably installable and affords a uniform contact, suitable for sealing, of the flange with the part accommodating the nut after termination of the process of deformation.

SUMMARY OF THE INVENTION

In the blind rivet nut according to the invention, the wall thickness of the deformable region at the thinnest points is 4% to 6% of the least outside diameter of the deformable region. It has been found that with such a comparatively small wall thickness, the deforming forces encountered, even in the case of thin-walled parts whose wall thickness is only about double the thinnest portions of the deformable region, do not lead to a deformation of the part such as to impair the uniform contact of the flange. Likewise, the deformable region forms a sufficiently stable polygonal bulge of such radial extent that a secure fastening of the blind rivet nut and a firm contact of its flange are ensured.

According to a further aspect of the invention, the flange of the blind rivet nut has a diameter corresponding to at least double the least outside diameter of the deformable region. As a result, the sheet-metal or other part supporting the blind rivet nut is supported by the flange in a large area around the attachment, and any deformation of the contact area is opposed. Besides, tilting forces acting on the blind rivet nut are more readily supported, reducing the load in the area of the deformation bulge.

The blind rivet nut, according to a further aspect of the invention, may be made of steel by cold forming using the flow pressure process. This highly economical method of production has the per se that the material is consolidated by the transformation, so that setting of the blind rivet nut requires higher deformation stresses and leads to a more intense loading of the sheet metal or other thin-walled part. Here the measurement of the wall thickness of the deformable region according to the invention represents a favorable compromise, since owing to the comparatively small wall thickness, the forces of deformation can be kept small, while on the other hand the cross section of the deformable region is still of adequate size so that the blind rivet nut can be produced by the flow pressure process. In the interaction of these measures, then, a blind rivet nut is created that satisfies installation and use requirements and furthermore can be produced especially economically.

BRIEF DESCRIPTION OF THE DRAWINGS

The invention will now be illustrated in more detail in terms of an embodiment by way of example, shown in the drawings in which.

DETAILED DESCRIPTION

Figure 1:
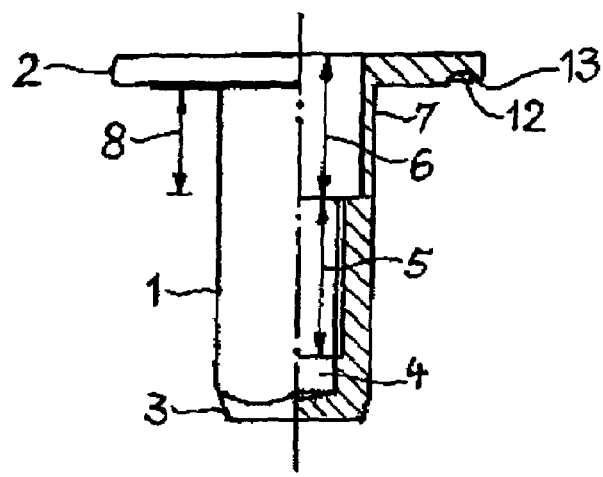
FIG. 1 shows a semi-sectional side view of a rivet nut according to the invention.
Figure 2:
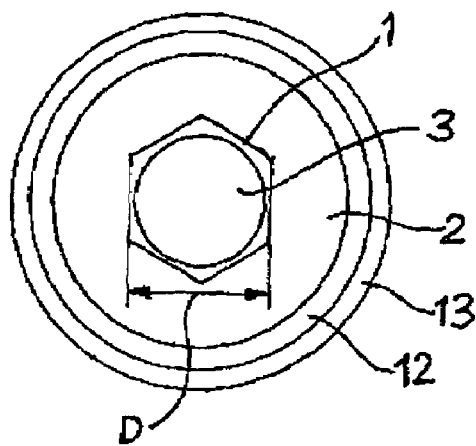
FIG. 2 shows a view of the rivet nut according to FIG. 1 from below.

The blind rivet nut represented in the drawing has an elongated shank 1, bearing a flange 2 at one end. The shank 1 has the shape of a regular hexagonal prism, and is conically pointed at its end opposed to the flange 2. Owing to the hexagonal outer contour, when the shank is placed in a suitably shaped bore adapted in size to the cross-section of the shank, rotation of the shank in the bore is prevented. The pointed end facilitates introduction of the shank into the bore. The flange 2 extends at right angles to the lengthwise axis of the shank 1 and has the shape of a plane circular disk. Alternatively, the flange may have a polygonal shape, for example, square or hexagonal.

Through the flange 2 and the greater part of the length of the shank 1, a bore 4 extends, whose lengthwise axis coincides with the lengthwise axis of the shank 1. The bore 4 is closed at the end 3 of the shank 1. It comprises a first bore segment 5 adjacent to the end 3, provided with an internal thread for screwing in a screw or bolt. The first bore segment 5 is adjoined by a second bore segment 6 extending to the top of the flange 2. The bore segment 6 has a constant diameter greater than the outside thread diameter of the internal thread of the first bore segment 5. The axial length of the second bore segment 6 corresponds essentially to the least outside diameter of the shank 1, also known as the wrench width, but may alternatively be greater, for example, to make possible installation in a thicker part or the connection of several parts to each other.

Figure 3:
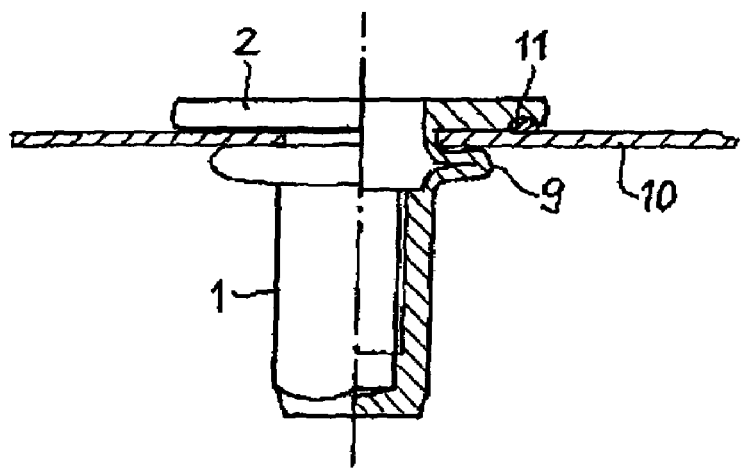
FIG. 3 shows a view of the rivet nut according to FIG. 1 as installed.

The wall 7 of the shank 1 surrounding the second bore segment 6 forms a deformable region 8 capable of being deformed into a bulge 9 radially cambered outward for attachment of the blind rivet nut to a part 10 as shown in FIG. 3. The least outside diameter of the shank 1 and the inside diameter of the bore segment 6 are so coordinated with each other that the wall 7 of the deformable region 8 has a wall thickness of 4% to 6%, preferably 4.5% to 5%, of the least outside diameter D of the shank 1 in the thinnest places located in the middle of the prism faces. In this way, especially in connection with the production of the blind rivet nut as a cold-formed flow pressure part, a deformation behavior of the deformable region 8 is obtained that ensures a uniform contact of the flange 2 with the part 10 connected with the blind rivet nut and a dependable seal of the flange 2 against the part 10. Deformations of the part 10 that would lead to warping and non-uniform contact of the flange 2 are avoided. By the specified ratio of wall thickness diameter, it is also brought about that the deformation bulge formed attains an especially great radial extent, so that a stable anchorage of the blind rivet nut to the part 10 can be obtained.

The flange 2 of the blind rivet nut has an outside diameter corresponding to at least double the outside diameter of the wall 7. Here the thickness of the flange 2 is at least four to five times the least thickness of the wall 7. The peripheral contour of the flange 2 is formed freely in the flow pressing of the blind rivet nut.

FIG. 3 shows the fastening of the blind rivet nut to a thin-walled part 10 of sheet metal. For attachment, the bore segment 5 of the blind rivet nut is first screwed onto the draw mandrel of a setting tool, and then the shank 1 of the blind rivet nut is inserted into a hexagonal opening in the part 10 until the flange 2 makes contact. Then the bore segment 5 is moved by the draw mandrel in the direction of the flange 2, the setting tool coming to be supported on the flange 2. By this operation, the deformable region 8 is compressed, so that it cambers radially outward and forms a bulge 9 that comes to bear firmly on the part 10 on the side away from the flange and thereby secures the blind rivet nut in the part 10.

To seal the blind rivet nut from the part 10, a sealing ring 11 is arranged between the flange 2 and the part 10. The sealing ring 11 engages an annular groove 12 of the flange 2, and is thereby held in a concentric position on the flange 2 with respect to the blind rivet nut. The thickness of the radially outward edge 13 of the annular groove 12 is somewhat less than the thickness of the flange 2, forming an annular gap between the edge 13 and the part 10, into which the sealing ring 11 can enter when axially compressed between the blind rivet nut and the part during installation of the former.

The invention has been described with reference to an exemplary embodiment. The scope and spirit of the invention are to be determined from appropriately interpreted claims.

What is claimed is:

1. A blind rivet nut comprising a head forming an annular flange and a shank comprising a head end, a foot end and a cylindrical bore extending in lengthwise direction from the head end to the foot end, closed at the foot end of the shank and having a first bore segment near the foot end, provided with an internal thread, and a second bore segment near the head end whose diameter is greater than the diameter of the first bore segment, the wall surrounding the second bore segment forming a deformable region of the shank and having an outer surface in the form of a regular polygonal prism, wherein the thickness of the wall of the deformable region in the thinnest places is 4% to 6% of the least outside diameter of the deformable region.

2. The blind rivet nut according to claim 1 wherein the diameter of the flange is at least double the size of the least outside diameter of the deformable region.

3. The blind rivet nut according to claim 1 wherein the thickness of the flange is at least four to five times the least thickness of the wall.

4. The blind rivet nut according to claim 1 wherein the flange comprises an annular groove to accommodate a sealing ring.

5. The blind rivet nut according to claim 1 being produced by cold forming using the flow pressure process.

* * * * *